United States Patent
Jackson et al.

(10) Patent No.: US 10,946,771 B2
(45) Date of Patent: Mar. 16, 2021

(54) MOTOR VEHICLE FLOOR

(71) Applicant: Ford Global Technologies, LLC, Dearborn, MI (US)

(72) Inventors: Daniel T. Jackson, Basildon (GB); Kenneth George Dell, Rainham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 16/460,054

(22) Filed: Jul. 2, 2019

(65) Prior Publication Data
US 2020/0016995 A1    Jan. 16, 2020

(30) Foreign Application Priority Data
Jul. 13, 2018    (GB) ..................................... 1811500

(51) Int. Cl.
| | |
|---|---|
| *B60N 2/005* | (2006.01) |
| *B62D 25/20* | (2006.01) |
| *B29C 45/14* | (2006.01) |
| *B29L 31/30* | (2006.01) |
| *B60H 1/00* | (2006.01) |
| *B62D 65/02* | (2006.01) |

(52) U.S. Cl.
CPC ............. *B60N 2/005* (2013.01); *B62D 25/20* (2013.01); *B29C 45/14* (2013.01); *B29L 2031/3005* (2013.01); *B60H 1/00564* (2013.01); *B62D 65/02* (2013.01)

(58) Field of Classification Search
CPC ........ B60N 2/005; B62D 25/20; B62D 65/02; B29C 45/14; B29L 2031/00564
See application file for complete search history.

(56) References Cited

U.S. PATENT DOCUMENTS

| | | | |
|---|---|---|---|
| 5,020,846 A | 6/1991 | Bonnett | |
| 6,361,099 B1* | 3/2002 | McIntosh | ................ B60N 3/04 220/235 |
| 2009/0179461 A1 | 7/2009 | Fuchs et al. | |
| 2013/0278002 A1 | 10/2013 | Preisler et al. | |
| 2015/0251705 A1 | 9/2015 | Mildner et al. | |
| 2018/0050735 A1* | 2/2018 | Jaunasse | ............... B60R 13/083 |

FOREIGN PATENT DOCUMENTS

| | | |
|---|---|---|
| DE | 2128318 | 12/1972 |
| DE | 3035644 | 5/1982 |
| DE | 102004037789 | 12/2005 |
| DE | 102005024263 | 12/2006 |
| DE | 102009015354 | 9/2010 |
| DE | 102012008853 | 10/2013 |

(Continued)

OTHER PUBLICATIONS

European Search Report for Application No. EP19184494.3, dated Nov. 6, 2019.

(Continued)

*Primary Examiner* — Lori L Lyjak
(74) *Attorney, Agent, or Firm* — David Coppiellie, Esq.; Carlson, Gaskey & Olds, P.C.

(57) ABSTRACT

A motor vehicle floor system includes an integral seat attachment point, and an over-molded seat attachment insert of a floor. The integral seat attachment point is provided on the seat attachment insert.

15 Claims, 4 Drawing Sheets

(56) References Cited

FOREIGN PATENT DOCUMENTS

| | | |
|---|---|---|
| DE | 102013007345 | 10/2014 |
| DE | 202014004476 U1 | 8/2015 |
| EP | 0061919 | 10/1982 |
| EP | 0333267 | 9/1989 |
| EP | 0756970 | 2/1997 |
| EP | 1084938 | 3/2001 |
| EP | 1288114 | 3/2003 |
| EP | 1464567 A1 | 10/2004 |
| EP | 1718515 | 11/2006 |
| EP | 1464567 | 9/2011 |
| FI | 120030079 | 7/2004 |
| FR | 3022520 | 12/2015 |
| GB | 2118909 | 11/1983 |
| WO | 2016042153 | 3/2016 |
| WO | 2017085367 | 5/2017 |

OTHER PUBLICATIONS

The GB Search Report for Application No. GB1811500.6, dated Dec. 5, 2018.

* cited by examiner

SECTION AA

MOTOR VEHICLE FLOOR

CROSS-REFERENCE TO RELATED APPLICATIONS

This application claims priority to GB Patent Application No. 1811500.6, which was filed on 13 Jul. 2018 and is incorporated herein by reference in its entirety.

TECHNICAL FIELD

This disclosure relates to a motor vehicle floor, and in particular, but not exclusively, relates to a molded motor vehicle floor that reduces the number of fixing points on a vehicle chassis.

BACKGROUND

A modern vehicle platform can include a vehicle frame, such as a chassis, an underbody floor and a floor liner. During the assembly of the vehicle, it is standard practice to assemble the underbody floor to the vehicle frame, and then fit out the interior of the vehicle with the floor liner, so that an interior vehicle component, such as a seat, can be attached to the vehicle frame at a later stage of production.

However, it is common for a vehicle manufacturer to supply many different variants of a vehicle. For example, a commercial vehicle, such as a van, may be manufactured for use as cargo vehicle or a passenger vehicle. In order to achieve this, the vehicle manufacturer typically ensures that the vehicle frame has structural architecture that is suitable for each of the different variants of the vehicle. For example, a cargo vehicle variant and a passenger vehicle variant may share a common design of the vehicle's chassis, which can be later modified to suit the desired use of the vehicle variant.

Furthermore, seating arrangements in vehicles, such as in a multi-purpose vehicle (MPV) and a commercial vehicle (CV), are becoming increasingly complex. As a result, it is difficult to design a vehicle chassis that is suitable for each variant of vehicle to be based. As a result, there are usually additional brackets and/or structural elements added to the chassis, which may become redundant for some vehicle configurations, leading to weight penalties and increased complexity in manufacturing.

Additionally, the floor liner, and other interior vehicle components, such as carpets, seat attachment points, HVAC ducting, and electrical wiring are all assembled separately to the vehicle, and require individual locator strategies and/or manufacturing assembly aids to fit into the body interior.

SUMMARY

According to an exemplary aspect of the present disclosure, a molded motor vehicle floor has a seat attachment point formed integral to the floor. The seat attachment point can comprise at least one feature configured to receive, and/or to be received by, a corresponding attachment feature on a vehicle seat. The seat attachment point may be provided on a seat attachment insert that is at least partially over-molded into the floor.

For example, the seat attachment insert may comprise a structural insert, such as a metal block, having one or more seat attachment points formed/machined into the insert. The seat attachment insert may comprise a seat tub to which an attachment feature on a vehicle seat may be coupled. The seat attachment insert may comprise one or more latches configured to secure, e.g. releasably secure, the vehicle seat to the seat attachment point. The seat attachment insert may comprise at least a portion of a seat rail to which the seat, e.g. a portion of a seat frame, may be moveably coupled. In one arrangement, the seat attachment insert may comprise a seat rail having a releasable latch that allows a corresponding attachment feature on a vehicle seat to be released from a first seat attachment point of the seat attachment insert and moved to a second seat attachment point of the seat attachment insert.

The floor may comprises a vehicle frame attachment point configured to locate the floor relative to a vehicle frame. For example, the vehicle frame attachment point may comprise at least one feature configured to receive, and/or to be received by, a corresponding attachment feature, such as a bracket and/or a stud, on a vehicle frame. In one arrangement, the vehicle frame attachment point may comprise an opening configured to receive a fastener, e.g. a fastener that can be used to secure the floor to the vehicle frame.

The vehicle frame attachment point may be provided on a vehicle frame attachment insert that is at least partially over-molded into the floor. For example, vehicle frame attachment insert may comprise a structural insert, such as a metal block, having one or more vehicle frame attachment points formed/machined into the insert. The vehicle frame attachment insert may comprise a spreader plate configured to be secured to the vehicle frame. The spreader plate may be configured to distribute a pull out force of the vehicle frame attachment insert from the vehicle floor, e.g. to help prevent the vehicle floor from becoming separated from the vehicle frame when a load is applied to the vehicle. The vehicle frame attachment insert may comprise one or more latches configured to secure, e.g. releasably secure, the vehicle floor to the vehicle frame.

The seat attachment point and the vehicle attachment point can cooperate to provide a required load path between a seat and the vehicle frame, in an assembled configuration. For example, where a vehicle seat comprises a seat belt attachment point, the load path may be defined such that the seat attachment point and the vehicle attachment point cooperate to resist a load applied to the seat belt attachment point, e.g. during an impact load. In other words, each of the seat attachment point and the vehicle attachment point may be configured to resist a load applied to the seat belt attachment point, to prevent the seat from becoming detached from the vehicle floor, and/or the vehicle floor from becoming detached from the vehicle frame.

The force required to pull the seat attachment insert out of the vehicle floor may be related to the size of the seat attachment insert. For example, a larger seat attachment insert may have a larger surface contact area between an outer surface of the seat attachment insert and the remainder of the vehicle floor, when compared to a smaller the seat attachment insert. Such a larger surface area may allow for a greater bond strength between the outer surface of the seat attachment insert and the remainder of the vehicle floor, when the seat attachment insert is over-molded into the vehicle floor.

The vehicle floor may comprise a seat belt attachment point. For example, the vehicle floor may comprise a seat belt attachment insert configured to be connected to an end of a seat belt, and/or a socket configured to receive a buckle of a seat belt.

The floor can comprise a heating, ventilation and air conditioning duct formed integral to the floor. For example, the floor may comprise one or more channels and/or cavities formed within a body portion of the floor. The duct may be configured to flow a fluid, e.g. air and/or a coolant, from one portion of the floor to another portion of the floor. The floor may comprise a first opening at one location, e.g. a first edge, of the floor and a second opening another location, e.g. a second edge, of the floor. The duct may be configured to connect, e.g. internally connect, the first opening to the second opening. The duct may comprise at least one wall that is configured to be in fluidic communication with a fluid of the heating, ventilation and air conditioning system. In other words, the duct itself may be configured to carry a fluid, rather than the duct being used to route though the floor another tube or pipe that is configured to carry a fluid.

The floor may be formed from a laminated structure. For example, the floor may be formed from a plurality of layers of material, such as a polymeric and/or a composite material. The floor may comprise a lower surface, e.g. a lower surface of a lower layer, configured to form at least a portion of the underbody of a vehicle, in an assembled configuration. For example, the lower surface of the floor may be configured to be in contact with the environment external to the vehicle, when the floor is assembled to the vehicle frame. The floor may be configured to sealably engage the vehicle frame, e.g. to prevent the ingress of environmental pollutants to an interior portion of the vehicle, when the floor is assembled to the vehicle frame. The floor may be shaped to conform to the shape of the vehicle frame, e.g. such that there are not any substantial gaps between a lower surface of the floor and the vehicle frame in an assembled configuration. The vehicle floor may comprise at least one recess, e.g. a channel, configured to receive a portion of the vehicle frame in an installed configuration.

The floor may comprise an upper surface, e.g. an upper surface of an upper layer, configured for use as a portion of interior trim of the vehicle, in an assembled configuration. For example, the upper layer may comprise a layer of carpet and/or rubber matting. In this manner, the vehicle floor may comprise a final level of interior trim of the vehicle, such that no further substantial assembly operation is required to fit out the interior floor of the vehicle, upon assembly of the vehicle floor to the vehicle frame.

The vehicle frame may form at least a portion of a chassis of the vehicle. The vehicle frame may be a ladderframe of a vehicle, the ladderframe defining at least one opening into which at least a portion of the floor may be installed.

The floor may comprise at least one underbody component attachment point configured to receive a fixing of the at least one underbody vehicle component. For example, the floor may comprise an underbody component insert, e.g. a threaded insert, configured to receive the fixing of the underbody vehicle component. The underbody component attachment point may comprise an insert that is formed integral to the floor. For example, the underbody component attachment point may be formed/machined directly into the floor.

Any of the above-mentioned types of attachment points of the molded vehicle floor may be configured to replace, e.g. to be used instead of, an attachment point of the vehicle frame, e.g. a bracket or stud attached to or formed into the vehicle frame. For example, a conventional vehicle frame may comprise an attachment point, such as a bracket or stud, configured to receive a fixing of a vehicle component, such as a seat. However, where the vehicle floor of the present disclosure comprises an integral attachment point, e.g. an attachment point of an over-molded insert, configured to receive a fixing of a vehicle component, the vehicle frame need not be provided with any similar attachment point. This is beneficial as it reduces the design complexity of the vehicle frame.

The floor may comprise at least one support member configured to attach to the vehicle frame to strengthen the vehicle frame when the floor is assembled to the vehicle frame. For example, as the floor is formed by virtue of a molding process, the support member may be a separate component that is over-molded into the floor, such that the support member is integral to the floor once the floor has been fabricated. The support member may be a separate article that is secured to the floor once the floor has been manufactured. The support member may be configured to brace the vehicle frame when the floor, which comprises the support member, has been installed to the vehicle frame. In this manner, the support member may be configured to increase the stiffness of at least one of the floor and the vehicle frame in an assembled configuration. The support member may be configured to extend substantially across an opening in the vehicle frame when the floor is installed the vehicle frame.

There may be provided a vehicle comprising the above described floor.

According to an aspect of the present disclosure there is provided a kit of parts for a motor vehicle floor assembly, the kit comprising: a first molded motor vehicle floor comprising a first over-molded seat attachment insert and a first seat attachment point provided on the first seat attachment insert. The first molded motor vehicle floor has a first integral seat attachment point configuration; and a second molded motor vehicle floor comprising a second over-molded seat attachment insert and a second seat attachment point provided on the second seat attachment insert, where the second molded motor vehicle floor has a second integral seat attachment point configuration, wherein one of the first molded motor vehicle and the second molded motor vehicle floor is selectively assembled to a vehicle frame depending on the desired use of the motor vehicle floor assembly.

According to an aspect of the present disclosure there is provided a method of manufacturing a molded motor vehicle floor, the method comprising molding the motor vehicle floor, wherein a seat attachment insert is over-molded into the floor, and wherein a seat attachment point is provide on the seal attachment insert. The seat attachment point thereby formed integral to the floor.

The method may comprise selecting the floor from a plurality of differently configured floors prior to attaching the selected floor to the vehicle frame. For example, there may be provided a first floor configured for a first use case, e.g. for use as a passenger vehicle, and a second floor configured for a second use case, e.g. for use as a commercial vehicle. Each of the first floor and a second floor may be of substantially the same shape and configured to attach to a similarly configured vehicle frame. In other words, the method may comprise a step of manufacturing a common vehicle frame that can be used across a range of vehicle variants, and manufacturing the first floor and a second floor that may be selectively assembled to the vehicle frame, such that the resultant vehicle floor assembly has one of a plurality of different use cases.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

The present disclosure provides a molded floor, e.g. a molded floor liner, for a motor vehicle. The molded floor may be configured for use on any type of motor vehicle, such a car, a van, a truck, or a motorcycle. However, for the sake of example and in the arrangement shown in the accompanying figures, the molded floor is a floor of a commercial vehicle, such as a van.

In the context of the present disclosure, the term "motor vehicle floor" refers to a vehicle component that is configured to be assembled to a vehicle frame so as to form a usable surface within a compartment of the vehicle. For example, the motor vehicle floor may be assembled to a vehicle chassis so as to form a platform on which cargo may be placed or occupants may be seated or stand within the vehicle. Further, the term "molded" (or molded) refers to a process of manufacturing an article by shaping liquid and/or pliable raw material using a rigid frame, i.e. a mold. For example, the present disclosure provides a motor vehicle floor having at least a portion formed using at least one of the following processes: injection molding, compression molding, and thermos forming, amongst others.

The vehicle frame to which the molded floor is assembled may comprise at least a portion of a chassis of a vehicle. For example, the vehicle frame may comprise a portion of closed or open framework configured to form the structural base of the vehicle to which other major components of the vehicle may be assembled. As such, the molded floor may be configured to at least partial span, cover and/or connect at least one closed and/or open portion of framework that forms the vehicle chassis.

Figure 1:
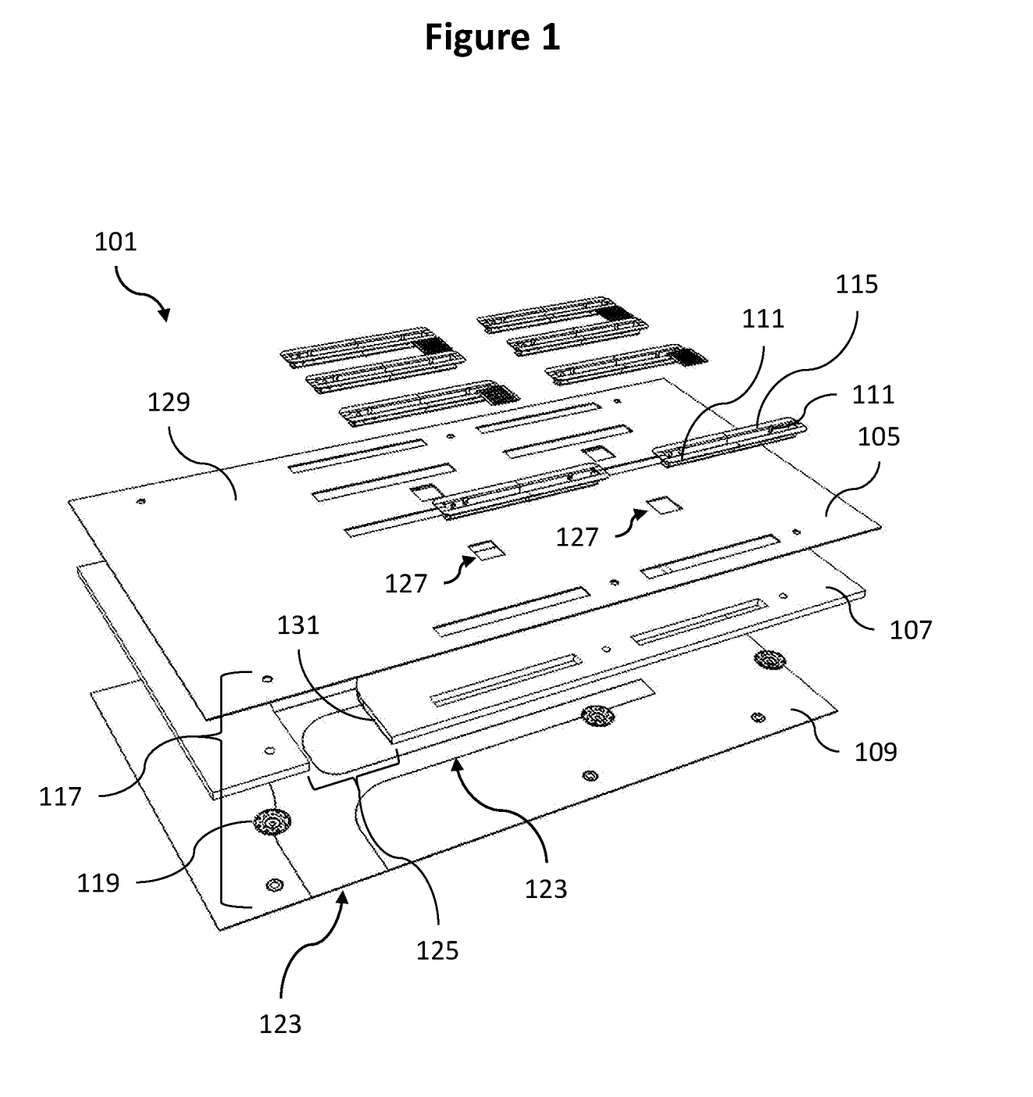
FIG. 1 shows an exploded view of molded motor vehicle floor.

FIG. 1 shows an exploded view of a molded motor vehicle floor 101 (referred to hereafter as the floor 101). The floor 101 comprises a composite molded floor, having a first layer 105, a second layer 107 and a third layer 109. Each of the layers 105, 107, 109 may be formed from any appropriate material. For example, each of the first and third layers 105, 109 may be formed from a first type of material, such as a polymer, and the second layer 107 may be formed from a second type of material, such as a foam, that is less dense than the first type of material. The material properties of each of the layers may be chosen depending on the operational requirements of the layer. For example, the first layer 105 may be configured for use as a layer of interior trim of the vehicle, such as a layer of carpet and/or rubber matting. The second layer 105 may be configured for use as a spacer layer, e.g. a layer configured to space the first layer 105 apart from the third layer 109, so as to provide a sufficient offset between the first layer 105 and the third layer 109 to allow one or more other component to be over-molded into the floor. The third layer 109 may be configured for use as a support/carrier layer. For example, the third layer 109 may be formed from a relatively rigid material onto which the first and second layers 103, 105 may be molded.

In one or more other arrangements (not shown), the floor may be formed from a single layer of molded material, or from any other appropriate multiple number layers.

As shown in FIGS. 1 to 4, the floor 101 comprises at least one seat attachment point 111 that is integral to the floor 101, when the floor is final state of manufacture. In this manner, the seat attachment point 111 is included as part of the floor 101 rather than supplied separately. This is advantageous, as an assembly worker on a vehicle assembly line is able to install the seat attachment points 111 by virtue of assembling the floor 101 to a vehicle frame 113. This is different to a conventional method of manufacturing a vehicle, since a conventional seat attachment point may be fixed directly to the vehicle frame, or may be formed in part of the vehicle frame. For example, a conventional vehicle manufacturer usually fits a vehicle frame with enough seat attachment points in order for to ensure that a vehicle frame has structural architecture that is suitable for each of the different variants of the vehicle based around the vehicle frame. As a result, one or more of the seat attachment points that have been added to the chassis become redundant for some vehicle configurations, leading to weight penalties and increased complexity in manufacturing. Furthermore, as seating arrangements in vehicles, such as a multi-purpose vehicles (MPV) and commercial vehicles (CV), become increasingly complex, it is difficult to design a vehicle frame having seat attachment points suitable for each variant of the vehicle. The present disclosure is thus beneficial, as it allows a vehicle manufacturer to supply the vehicle frame 113 without any seat attachment points 111 fitted to the frame. Instead, the seat attachment points 111 can be formed integral to the vehicle floor 101, so that the seat attachment points 111 are installed to the vehicle frame 113 during the installation of the vehicle floor 101 to the vehicle frame 113.

Figure 4:
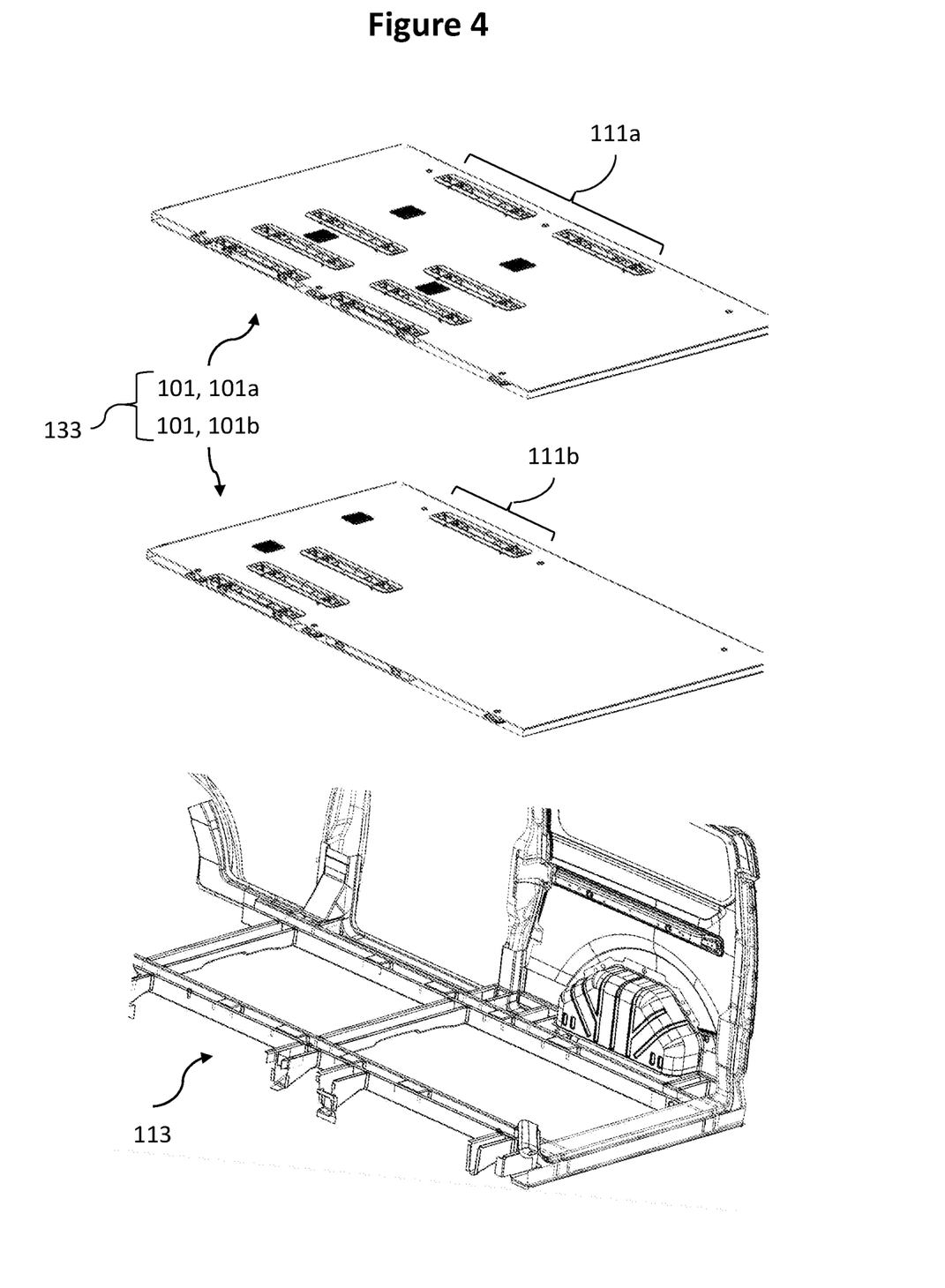
FIG. 4 shows a kit of parts for a motor vehicle floor assembly.

Another advantage of the present disclosure, is that the vehicle floor 101 may be manufactured in any appropriate number of configurations, as required by the different variants of the vehicle. For example, the vehicle manufacturer may provide a first vehicle floor 101a having a first configuration of seat attachment points 111, and a second vehicle floor 101b having a second configuration of seat attachment points 111, as shown in FIG. 4. In this manner, the vehicle manufacture can select which of the first vehicle floor 101a and the second vehicle floor 101b to install to the vehicle frame 113, depending on the variant of the vehicle.

Furthermore, the vehicle manufacturer is able to control the positional tolerances of the seat attachment points 111 in a more controlled manner when the seat attachment points 111 are integral to the vehicle floor 101, compared to when the seat attachment points are fixed directly to the vehicle frame 113. This is because the position of the seat attachment points 111 in the vehicle floor 101 is set during the molding/machining of the vehicle floor 101, instead of when the seat attachment points are fixed to the vehicle frame 113, which is typically done by virtue of a welding operation, joining a metal bracket to the vehicle frame 113, which is a relatively low tolerance assembly operation.

Although not shown in the below figures, the seat attachment point 111 may be formed directly into the molded vehicle floor 101. For example, where the vehicle floor 101 is made from a suitable material, the seat attachment point 111 may comprise one or more features molded directly into the floor to which a vehicle seat may be latched, such as a post, bar and/or opening in the molded vehicle floor 101. Additionally or alternatively, the seat attachment points 111 may be machined directly into the molded vehicle floor 101. For example, where the vehicle floor 101 is made from a suitable material, the seat attachment points 111 may comprise a threaded portion that is cut directly into the material from which the floor 101 is molded.

In the arrangement shown in the below figures, the seat attachment point may be provided on a seat attachment insert 115 that is over-molded into the vehicle floor 101. The seat attachment insert 115 may comprise one or more features configured to receive, and/or to be received by, a corresponding feature on a vehicle seat. In the arrangement shown in FIGS. 1 to 4, the seat attachment insert 115 comprises a tub-shaped structure comprising two seat attachment points 111 configured to receive corresponding features, e.g. latches, that project from the underside of a vehicle seat. In the arrangement shown in FIGS. 1 to 4, each of the tubs is orientated in a longitudinal direction of the vehicle floor 101 so as to receive respective forward and rearward features that project from a lateral side of the underside of a vehicle seat. The tub is generally U-shaped in cross-section along its length, has closed ends and has a flange configured to engage an upper surface of the first layer 105 of the vehicle floor 101 in an assembled configuration. However, the form of the seat attachment insert 115 is not limited to that shown in the appended figures. Indeed, the seat attachment insert 115 may have any appropriate form and/or may be oriented in any appropriate direction depending on the requirement of the vehicle floor 101, and the variant of the vehicle to which the vehicle floor 101 is to be installed.

In the arrangement shown in FIGS. 1 to 4, the vehicle floor 101 comprises a plurality of vehicle frame attachment points 117 configured to locate the vehicle floor 101 relative to the vehicle frame 113. In a similar way to the seat attachment point 111, each of the vehicle frame attachment points 117 may be formed directly into the molded vehicle floor 101, machined directly into the molded vehicle floor 101, and/or provided on a vehicle frame attachment insert 119 that is over-molded into the vehicle floor 101.

Figure 3:
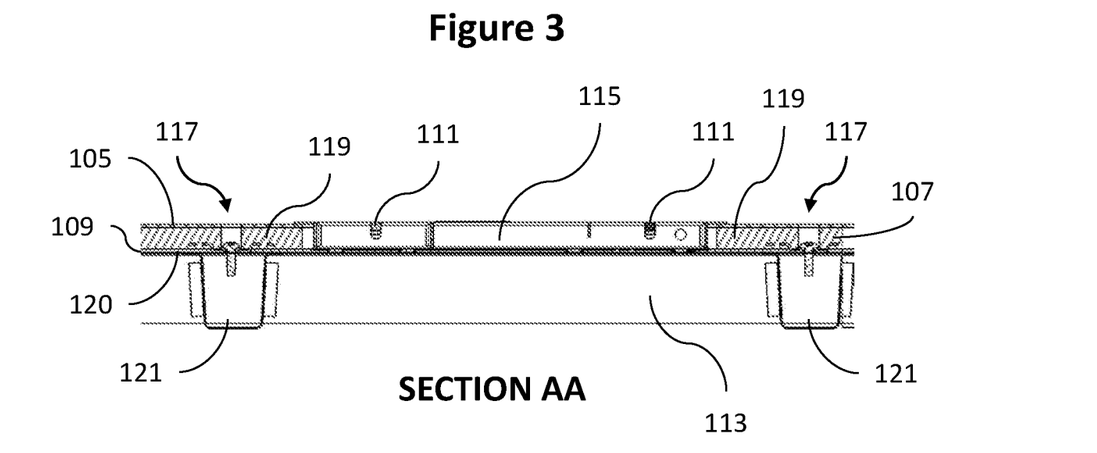
FIG. 3 shows a partial cross section through the motor vehicle floor assembly of FIG. 2.

The vehicle frame attachment insert 119 may comprise a dished plate that is over-molded into the vehicle floor 101 so that a lower surface of the plate engages an upper surface of a lower layer, e.g. the third layer 109, of the vehicle floor 101, in a final state of manufacture of the vehicle floor 101. Further, the attachment insert 119 may comprise a central opening configured to receive a fastener that can be used to secure, e.g. clamp, the vehicle floor 101 to the vehicle frame 113, as shown in FIG. 3. This arrangement ensures that the vehicle floor 101 is securely fastened to the vehicle frame 113, and that the clamp force is not transferred through the upper layers, e.g. the first or second layers 105, 107, of the floor 101, which may deform under clamp loading.

In the arrangement shown in FIGS. 1 to 4, the position of the seat attachment insert 115 relative to the vehicle attachment insert 119 are selected to provide a desired load path between a seat and the vehicle frame, when the vehicle floor 101 is assembled to the vehicle frame 113. For example, the seat attachment insert 115 in the arrangement shown is configured to secure a seat, which includes a seat belt attachment point, to the vehicle floor 101. Thus, upon an impact to the vehicle, the load path from the seat belt attachment point of the seat transfers through the coupling between the seat and the seat attachment insert 115, through a body portion of the vehicle floor 101, and through the coupling between the vehicle attachment insert 119 and the vehicle frame 113. As such, the vehicle floor 101 is configured to provide a desired load path between a seat belt fixing point of a vehicle seat and the vehicle frame 113. In other words, the relative positions of the seat attachment point 111 and the vehicle attachment point 117 have a mathematical relationship depending on the desired load path. Such a design consideration is required where a vehicle seat is not directly secured to a vehicle frame.

In one arrangement, not shown, the seat attachment insert 115 and the vehicle attachment insert 119 may be joined by one or more other structural members of the vehicle floor 101. For example, the vehicle floor 101 may comprise a structural member at least partially over-molded in the vehicle floor 101, the structural member being configured to provide a load path directly between the seat attachment insert 115 and the vehicle attachment insert 119. This is advantageous, as it may allow the size of the seat attachment insert 115 to be reduced, by virtue of a lower requirement on the bond strength between the seat attachment insert 115 and a body portion of the vehicle floor 101.

Figure 2:
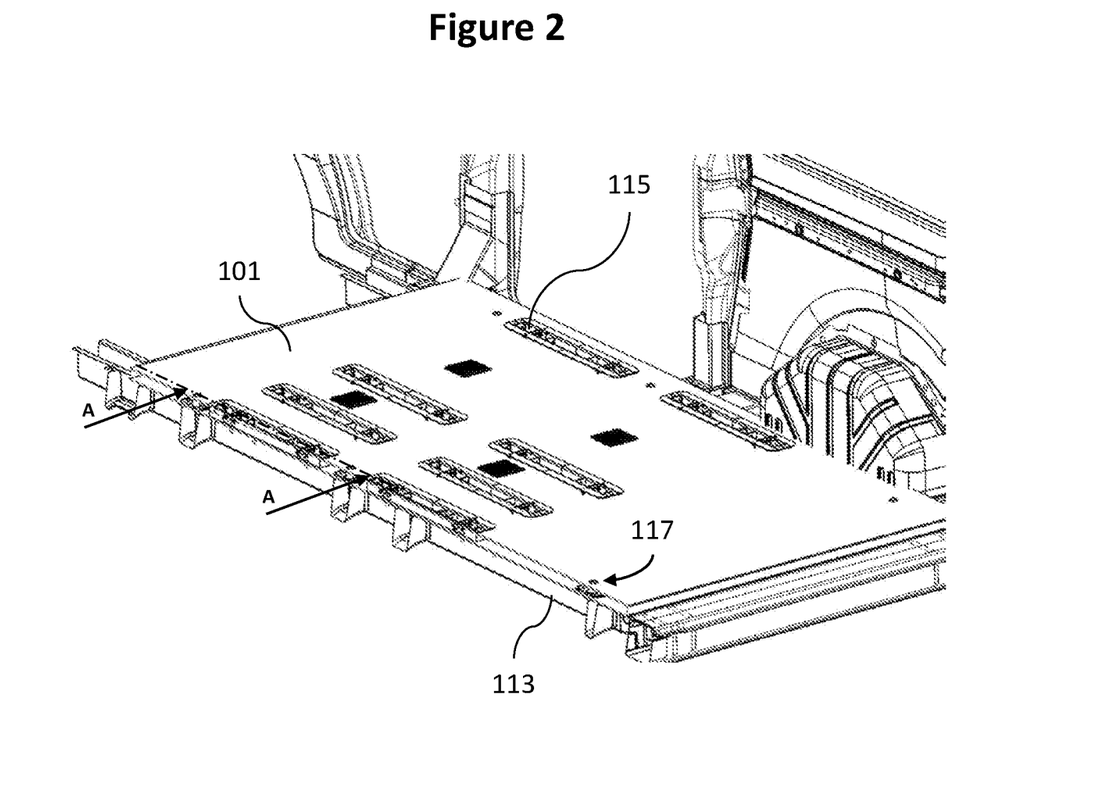
FIG. 2 shows a motor vehicle floor assembly.

FIGS. 2 and 3 show the vehicle floor 101 assembled to the vehicle frame 113, which in this case is a ladder frame chassis of a commercial vehicle, such as a van. The vehicle floor 101 is configured to span substantially the ladder frame such that the vehicle floor 101 provides a useable loadspace/cargo area floor when assembled to the vehicle frame 113. FIG. 3 shows a cross section through the assembly shown in FIG. 2. From the cross section, it can be seen that a lower surface 120 of the vehicle floor 101 is substantially planar, spanning across the lateral members 121 ladder frame. However, in one or more other arrangements, the lower surface 120 of the vehicle floor 101 may be shaped/contoured to fit within at least one of a closed or open portion of the vehicle frame 113. For example, the vehicle floor 101 may have one or more protrusions that project into, and/or through, at least one of the openings of the ladderframe. In this manner, the protrusions may be used to locate and/or secure the vehicle floor 101 relative to the vehicle frame 113.

In one arrangement, the lower surface 120 may be configured to form at least a portion of the underbody of the vehicle. For example, the third layer 109 of the vehicle floor 101 may be a corrosion resistant material configured to withstand exposure to environmental pollutants. Additionally or alternatively, the lower surface 120 may be configured to sealably engage against the vehicle frame 113, such that the vehicle floor 101 forms both of a loadspace floor of the vehicle and the underbody of the vehicle.

The vehicle floor 101 may comprise one or more underbody component attachment points (not shown) configured to allow one or more underbody component of a vehicle, such as a portion of an exhaust system, to be assembled to the vehicle floor 101. In a similar way to the seat attachment point 111 and the vehicle frame attachment point 117, each of the underbody component attachment points may be formed directly into the molded vehicle floor 101, machined directly into the molded vehicle floor 101, and/or provided on an underbody component attachment insert that is over-molded into the vehicle floor 101.

Referring back to FIG. 1, the vehicle floor 101 may comprise a heating, ventilation and air conditioning (HVAC) duct 123 formed integral to the floor. For example, where the vehicle floor 101 is formed from multiple layers, one of the internal layers, e.g. the second layer 107, may be formed so as to provide a channel, or network of channels, that extend though the vehicle floor 101. In the arrangement of FIG. 1, the vehicle floor 101 has a duct 123 that extends laterally in from an opening 125 in one side face of the vehicle floor 101, and longitudinally through the body of the vehicle floor 101 to meet a plurality of openings 127 in the top surface 129 of the vehicle floor 101. In this manner, air may be circulated within the vehicle floor 101 without the need to provide separate ducting for an HVAC system.

In one arrangement, the opening 125 in the side face of the vehicle floor 101 may be configured to connect directly with another duct of the HVAC system. For example, the vehicle floor 101 may comprise an HVAC connector formed integral with the vehicle floor 101. In this manner, the duct 123 formed in the vehicle floor 101 may be configured to flow warm/cold air of the HVAC system without the need for a separate duct to be routed around and/or through the vehicle floor 101. In other words, a wall 131 of the duct 123 may be configured to be in direct contact with the air flowed from the HVAC system. Additionally or alternatively, the duct 123, or another duct in the vehicle floor 101 (not shown), may be configured to flow a coolant of the HVAC system. This may be beneficial where a seat of the vehicle comprises a coolant circuit configured to cool the seat.

FIG. 4 shows a kit of parts 133 for a motor vehicle floor assembly. The kit 133 comprises a plurality of differently configured vehicle floors 101, each of which is configured to be installed to the vehicle frame 113. For example, the kit 133 may comprise a first molded motor vehicle floor 101a having a first configuration 111a of integral seat attachment points 111, and a second molded motor vehicle floor 101b having a second configuration 111b of integral seat attachment points 111. For example, the first molded motor vehicle floor 101a may be configured so that two rows of vehicle seats may be attached to the vehicle floor 101a, and the second molded motor vehicle floor 101b may be configured so that a single row of vehicle seats may be attached to the vehicle floor 101b. However, the first and second configurations 111a, 111b of integral seat attachment points 111 are not limited to those shown in FIG. 4. Indeed, the configuration of integral seat attachment points 111 may be any appropriate configuration depending on the usage requirements of the vehicle variant. In this manner, the kit of parts 133 allows for one of the first molded motor vehicle floor 101a and the second molded motor vehicle floor 101b to be selectively assembled to a vehicle frame depending on the desired use of the motor vehicle floor assembly. This is advantageous, as it allows for the vehicle frame 113 to be simplified by virtue of removing the need to provide the vehicle frame 113 with sufficient architecture, e.g. enough bracketry, to account for all eventual uses of the vehicle frame 113.

Additionally or alternatively, the first molded motor vehicle floor 101a may have a first HVAC duct configuration formed integral to the floor, and the second molded motor vehicle floor 101b may have a second HVAC duct configuration formed integral to the floor. For example, the first molded motor vehicle floor 101a may be configured to flow air from the HVAC system to a plurality of rows of vehicle seats attached to the vehicle floor 101a, and the second molded motor vehicle floor 101b may be configured to flow air from the HVAC system to a single row of vehicle seats attached to the vehicle floor 101b. However, the first and second configurations of the integral HVAC ducts are not limited to those shown in FIG. 4. Indeed, the configuration of integral HVAC ducts may be any appropriate configuration depending on the usage requirements of the vehicle variant.

Figure 5:
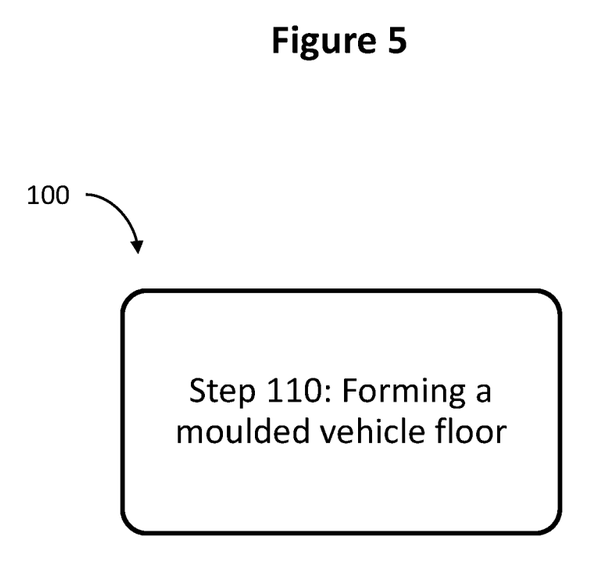
FIG. 5 shows a flow chart depicting a method of manufacturing a molded motor vehicle floor.

FIG. 5 shows a flowchart of a method 100 of manufacturing a molded motor vehicle floor 101, 101a, 101b, the method 100 comprising forming the seat attachment point 111 integral to the floor 101, 101a, 101b. In one arrangement, the seat attachment point 111 maybe formed directly into the material from which the molded motor vehicle floor 101, 101a, 101b is manufactured, for example by virtue of molding the seat attachment point 115 directly into the floor 101, 101a, 101b, and/or by machining the seat attachment point 111 directly into the floor 101, 101a, 101b. Additionally or alternatively, the seat attachment point 111 may be provided on the seat attachment insert 115 that is over-molded into the floor 101, 101a, 101b.

The method 100 may comprise another step of selecting the floor 101, 101a, 101b from a plurality of differently configured floors 101, 101a, 101b prior to attaching the floor 101, 101a, 101b to the vehicle frame 113. For example, there may be provided a first floor 101a configured for a first use case, e.g. for use as a passenger vehicle, and a second floor 101b configured for a second use case, e.g. for use as a commercial vehicle. Each of the first floor 101a and the second floor 101b may be substantially of the same shape and be configured to attach to the same type of vehicle frame 113. In other words, the method 100 may comprise a step of manufacturing a common vehicle frame 113 that can be used across a range of vehicle variants, and manufacturing the first floor 101a and the second floor 101b that may be selectively assembled to the vehicle frame 113, such that the resultant vehicle floor assembly has one of a plurality of different use cases.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A motor vehicle floor system, comprising:
an integral seat attachment point; and
an over-molded seat attachment insert of a floor, wherein the integral seat attachment point is provided on the seat attachment insert.

2. The motor vehicle floor system of claim 1, wherein the floor comprises a vehicle frame attachment point for locating the floor relative to a vehicle frame.

3. The motor vehicle floor system of claim 2, wherein the vehicle frame attachment point is provided on a vehicle frame attachment insert that is over-molded into the floor.

4. The motor vehicle floor system of claim 2, wherein the integral seat attachment point and the vehicle attachment point cooperate to provide a load path between a seat and the vehicle frame, in an assembled configuration.

5. The motor vehicle floor system of claim 1, wherein the floor comprises a heating, ventilation and air conditioning duct formed integral to the floor.

6. The motor vehicle floor system of claim 5, wherein a wall of the duct is configured to be in fluidic communication with a fluid of a heating, ventilation and air conditioning system.

7. The motor vehicle floor system of claim 1, wherein the floor is a laminated structure.

8. The motor vehicle floor system of claim 1, wherein the floor comprises a lower surface configured to form at least a portion of the underbody of a vehicle, in an assembled configuration.

9. The motor vehicle floor system of claim 1, wherein the floor comprises an upper surface configured for use as a portion of interior trim of a vehicle, in an assembled configuration.

10. The motor vehicle floor system of claim 1, wherein the floor is a molded floor.

11. A vehicle comprising the molded motor vehicle floor of claim 1.

12. A kit of parts for a motor vehicle floor assembly, the kit comprising:
   a first molded motor vehicle floor comprising a first over-molded seat attachment insert and a first seat attachment point provided on the first seat attachment insert, wherein the first molded motor vehicle floor has a first integral seat attachment point configuration; and
   a second molded motor vehicle floor comprising a second over-molded seat attachment insert and a second seat attachment point provided on the second seat attachment insert,
   wherein the second molded motor vehicle floor has a second integral seat attachment point configuration,
   wherein the first and second molded motor vehicle floors are configured such that one of the first and second molded motor vehicle floors can be selectively assembled to a vehicle frame.

13. The kit of claim 12, wherein the first molded motor vehicle floor comprises a vehicle frame attachment point for locating the first molded motor vehicle floor relative to the vehicle frame, wherein the second molded motor vehicle floor comprises a vehicle frame attachment point for locating the second molded motor vehicle floor relative to the vehicle frame.

14. A method of manufacturing a molded motor vehicle floor, the method comprising: molding the motor vehicle floor, wherein a seat attachment insert is over-molded into the floor, and wherein a seat attachment point is provided on the seat attachment insert, the seat attachment point thereby being formed integral to the floor.

15. The method of claim 14, wherein the motor vehicle floor comprises a vehicle frame attachment point for locating the motor vehicle floor relative to a vehicle frame.

* * * * *